US006772060B2

United States Patent
McCauley et al.

(10) Patent No.: US 6,772,060 B2
(45) Date of Patent: Aug. 3, 2004

(54) ELECTRONIC ENGINE CONTROL AND METHOD

(75) Inventors: Thomas A. McCauley, Brimfield, IL (US); Marvin K. Palmer, Bloomington, IL (US); Bryan A. Vogt, Naperville, IL (US)

(73) Assignee: Caterpillar Inc, Peoria, IL (US)

( * ) Notice: Subject to any disclaimer, the term of this patent is extended or adjusted under 35 U.S.C. 154(b) by 263 days.

(21) Appl. No.: 10/004,067

(22) Filed: Oct. 25, 2001

(65) Prior Publication Data

US 2003/0079720 A1 May 1, 2003

(51) Int. Cl.$^7$ .............................. G05D 1/00; B60T 7/12
(52) U.S. Cl. .................. 701/104; 123/350; 123/198 D; 701/112
(58) Field of Search ................................ 701/104, 105, 701/107, 108, 112; 123/305, 350, 568.21, 568.22, 198 D, 540, 542, 563

(56) References Cited

U.S. PATENT DOCUMENTS

| | | | |
|---|---|---|---|
| 5,540,199 A | * | 7/1996 | Penn ........................... 123/243 |
| 5,594,643 A | | 1/1997 | Birchenough et al. |
| 5,609,067 A | | 3/1997 | Mitchell et al. |
| 5,609,550 A | | 3/1997 | Saxena et al. |
| 5,617,826 A | * | 4/1997 | Brandt ........................ 123/450 |
| 5,848,371 A | | 12/1998 | Creger |
| 5,873,427 A | | 2/1999 | Ferguson et al. |
| 6,094,617 A | | 7/2000 | Lapke |
| 6,257,207 B1 | * | 7/2001 | Inui et al. .................... 123/491 |
| 6,363,314 B1 | * | 3/2002 | Hafner et al. ................ 701/104 |
| 6,363,315 B1 | * | 3/2002 | Love et al. .................. 701/104 |
| 6,529,815 B2 | * | 3/2003 | Hawkins et al. ............. 701/104 |

* cited by examiner

Primary Examiner—Willis R. Wolfe
Assistant Examiner—Johnny H. Hoang
(74) Attorney, Agent, or Firm—R Carl Wilbur

(57) ABSTRACT

An electronic engine control is provided that compensates the engine's power output capability based on the parasitic power load demands.

21 Claims, 3 Drawing Sheets

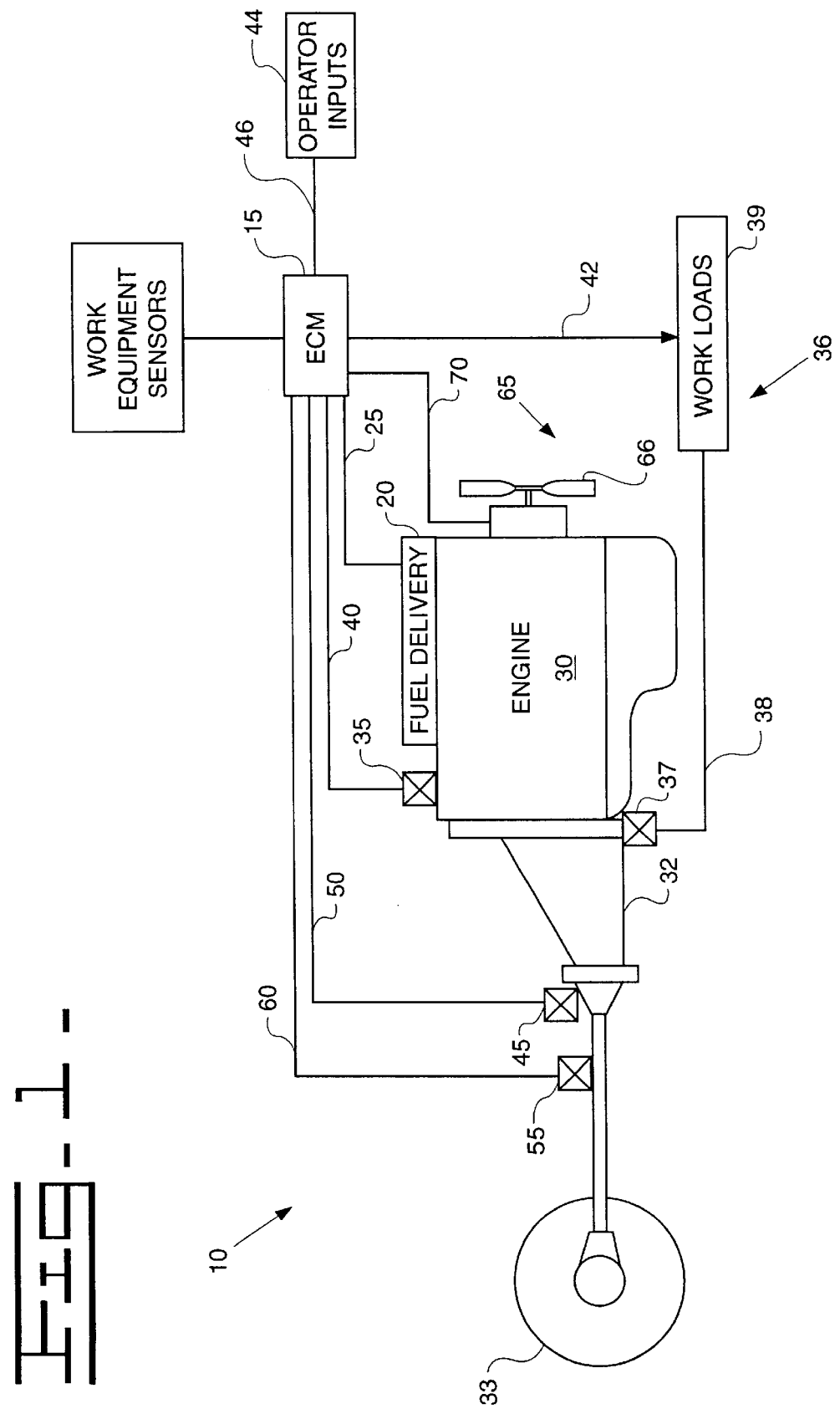

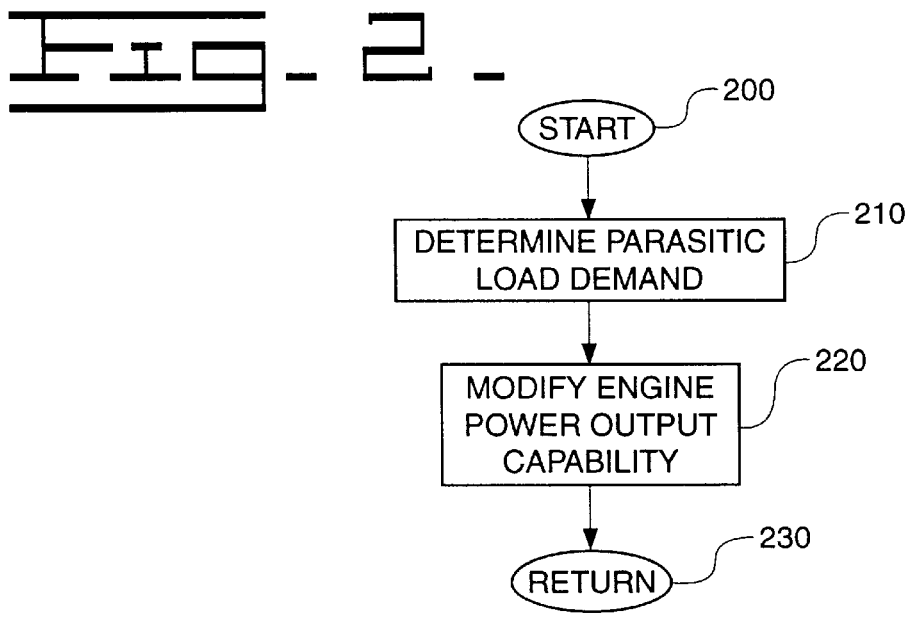
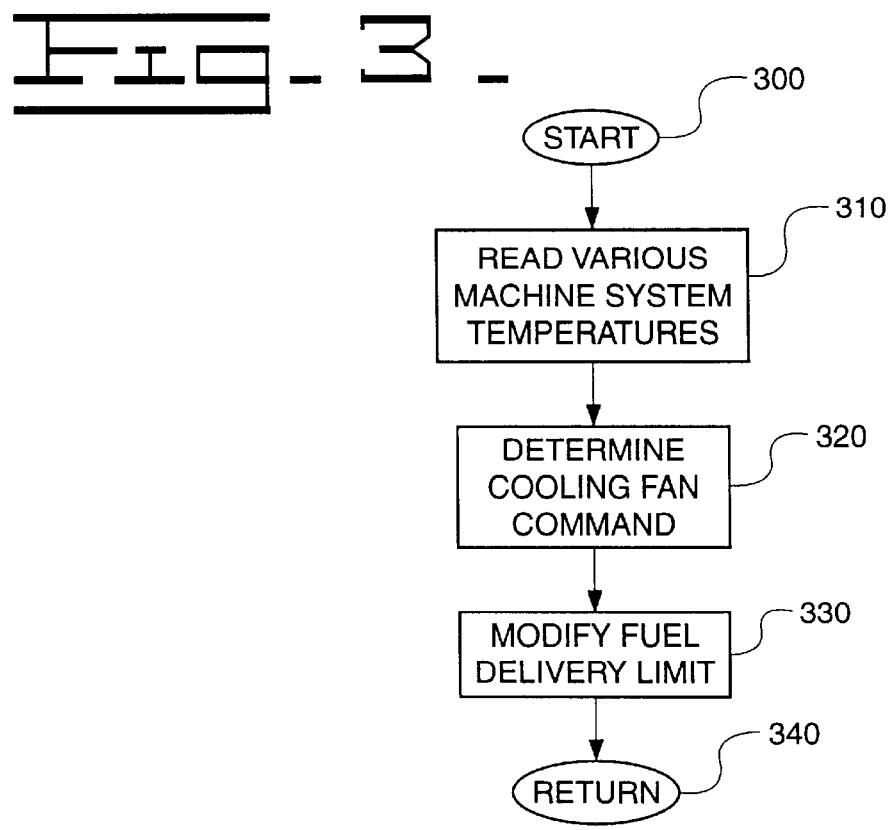

Fig-4-
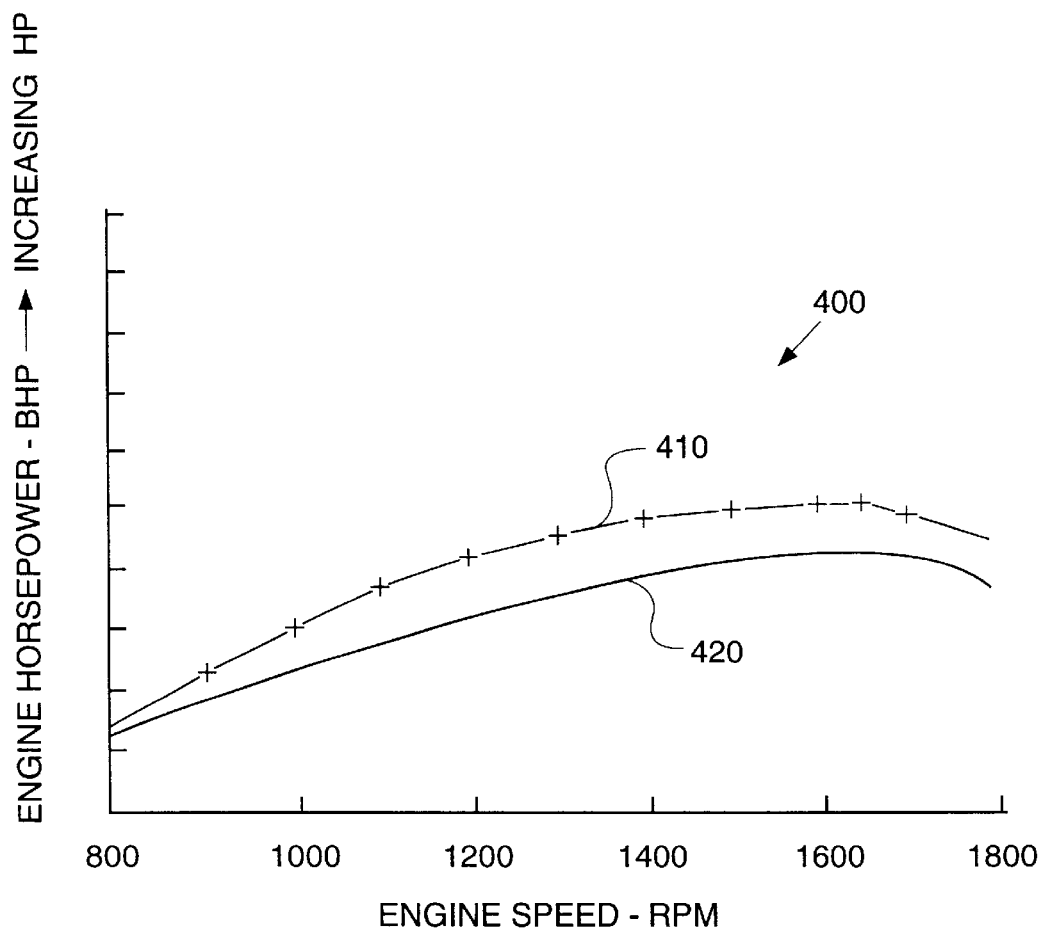

ELECTRONIC ENGINE CONTROL AND METHOD

TECHNICAL FIELD

The present invention relates to the field of compression ignition engines, and more particularly to the field of electronic control of the power output of compression ignition engines.

BACKGROUND

Electronically controlled compression ignition engines are known in the art, but vary in the degree of sophistication in the control schemes they employ. In general, the electronic controllers associated with such engines are connected with fuel injection devices that inject a predetermined amount of fuel at a predetermined time into each of the cylinders of the engine based on a corresponding fuel injection signal produced by the controller. The fuel injection signals therefore determine the amount of fuel injected into the cylinders and the power output of the engine.

Depending on the specific application, the electronic controller may be connected with a variety of different operator inputs and other sensors including a throttle sensor input, cruise control settings, and various engine and transmission sensor inputs, among others. The electronic controller receives inputs from these sensors and determines the fuel injection signal which may be a function of many factors, including the overall amount of fuel to be injected, and the shape, number, duration and timing of individual injections for a particular engine cylinder. The characteristics of the fuel injection signal will determine the overall power output of the engine. In some engine applications there are fuel delivery limits that are stored in memory, or otherwise associated with the electronic controller. In particular applications where the operator, cruise control or other aspect of the electronic controller might otherwise request a fuel injection signal that would cause the engine to produce a power output greater than the rated horsepower output of the engine, the controller will limit the amount of fuel delivered as a function of the fuel delivery limit curve, which therefore limits the power output of the engine.

Those skilled in the art will recognize that engines used in work equipment applications are typically required to provide power to at least two different kinds of loads: work loads; and parasitic loads. In general, work loads are devices or systems that produce a net work output from the work equipment and generally include a transmission which demands power from the engine to propel the wheels, tracks, or other ground engaging propulsion mechanism, and a hydraulic system which demands power from the engine to move a bucket, for example, to dig and move dirt or earth. Parasitic loads, in contrast, are typically characterized as those loads that demand power output from the engine, but do not produce actual work output from the work equipment. Devices that may fall in this category include an engine cooling fan, a compressor for an air conditioning system, an alternator and other devices. For example, the engine cooling fan requires engine power to draw air through the radiator to cool the engine. The compressor requires engine power to run the air conditioning system and the alternator requires engine power to generate electrical power to recharge batteries and run electrical accessories. These parasitic loads reduce the amount of power that is available to the work loads.

Electronically controlled compression ignition engines that are known in the art do not vary the output power of the engine based on parasitic loads. Because the parasitic loads decrease the power available for work loads, the work load power of such engines will vary depending on the overall engine power output and the amount of power required by the parasitic loads. Because the parasitic load will vary depending on various conditions, work equipment operators are often unable to determine the amount of work power that will be available. For example, when the work equipment is operated in the morning and the temperature is relatively cool, the cooling fan may require little or no power to maintain a desired engine operating temperature. As the ambient temperature increases during the day, more power may be required by the cooling fan to maintain the desired engine temperature, and the operator may notice an undesirable decrease in the amount of engine power available to do work.

It would be preferable to have a system that generated a relatively constant workload power output. These and other aspects and advantages of present invention will become apparent upon reading the detailed description in connection with the drawings and appended claims.

SUMMARY OF THE INVENTION

In one aspect of the present invention a system for controlling fuel delivery to a compression ignition engine is disclosed. Prefereably the engine controllably powers at least a transmission or a work implement system, and one other device. The system includes an electronic control module connected with the other device and the transmission or work implement system. A fuel injection device is also connected with the electronic control module. The electonic control permits the engine to produce a first power output when the other device does not demand power, and a second power output when the other device demands power.

BRIEF DESCRIPTION OF THE DRAWINGS

For a better understanding of the present invention, reference may be had to a best mode embodiment depicted in drawings, in which:

FIG. 1 generally illustrates an electronically controlled internal combustion engine system;

FIG. 2 illustrates a preferred embodiment of software control associated a preferred embodiment of the present invention;

FIG. 3 illustrates a preferred embodiment of software control associated with a preferred emboidment of the present invention in which the electronic controller controls the speed of a cooling fan; and FIG. 4 generally illustrates an example of a fuel delivery limit curves that may be stored in a memory device associated with a preferred emboidment of the present invention.

DETAILED DESCRIPTION

The following is detailed description of a best mode embodiment of the present invention and is described in connection with its implementation on work equipment such as a hydraulic excavator, or other construction or earth moving equipment. The following description provides sufficient detail to permit someone skilled in the art to make and use the invention. The present invention, however, is not limited to the single preferred embodiment disclosed herein. On the contrary, the present invention encompasses all those devices and methods that fall within the scope of the present invention as defined by the appended claims and equivalents thereof. Throughout the description and the drawings like reference numbers will be used to refer to like elements.

Referring first to FIG. 1, a system level block diagram of a preferred embodiment of the electronic engine control system 10 of a preferred embodiment of the present invention is shown. In addition to various engine sensors and actuators, the engine control system 10 may include various work equipment and transmission sensor inputs and perform various work equipment and transmission control outputs. However, the present invention may also be performed within an engine control system 10 that does not include these additional work equipment and transmission features. The present description of the best mode, however, includes a description of some of the work equipment and transmission controls that may be included in the engine control system 10.

As shown in FIG. 1, the engine control system 10 preferably includes an internal combustion engine 30, which in a preferred embodiment is a compression ignition internal combustion engine. The engine 30 is connected with a transmission 32 which transmits engine power output to a final drive sprocket 33, wheel or the like through appropriate gearing. The final drive sprocket 33 then is capable of transmitting power output of the engine 30 to a ground engaging propulsion device such as a track or a tire that can then propel the work equipment. As is known to those skilled in the art, a hydraulic excavator or other equipment with tracks will generally include two such drive sprockets, each driving a track on one side of the equipment. The engine 30 is also connected with a work implement system 36, which in a preferred embodiment includes a hydraulic system including a hydraulic pump 37 connected to a work implement 39 through appropriate hydraulic conduits 38. The work implement 39 may include a plurality of hydraulic cylinders 39 or the like, which in a hydraulic excavator may be associated with one of the various control aspects of the bucket, boom, or stick to permit the operator to accurately and efficiently dig and move dirt or other material.

A preferred embodiment of the electronic control system 10 includes an electronic control module ("ECM") 15, which preferably includes a microprocessor, a memory device and input/output ports that permit the microprocessor to receive sensor and operator inputs and issue commands to various engine and work equipment actuators. In a preferred embodiment, the microprocessor is a Motorola MC68HC11 manufactured by Motorola Corp. However, other microprocessors could be readily and easily used without deviating from the scope of the present invention. As is known to those skilled in the art, the memory device associated with the ECM 15 generally stores both software instructions and data. The software instructions stored in the memory device include, among other things, the specific code that controls the engine 30. The data stored in the memory may either be permanently stored or may be temporarily written to the memory device by the microprocessor. The microprocessor is therefore generally able to both read data and software instructions from, and write to, the memory device.

As shown in FIG. 1, the ECM 15 is connected with a fuel delivery device 20 which is associated with an engine 30. The ECM 15 calculates or determines a desired amount of fuel to be injected into the individual cylinders in the engine 30 and delivers corresponding fuel delivery signals over an electrical connector 25 which, at least in part, determine the power output of the engine 30. Although the electrical connector 25 to the fuel delivery device 20 is shown as a single connector, those skilled in the art will recognize that this representation may include a plurality of connections between the ECM 15 and the fuel delivery device 20, especially in instances where the fuel delivery device 20 includes a plurality of fuel injectors, each associated with a specific engine cylinder.

The ECM 15 is also connected with various engine sensors 35 over a connector 40. These sensors typically include an engine speed sensor, engine temperature and other sensors capable of producing a signal on the connector 40 which is indicative of a particular operating state of the engine 30. The connector 40, although shown as a single connection, may include a plurality of connectors, each connected with a particular engine sensor 35.

The ECM 15 is shown in FIG. 1 as being connected with transmission sensors 45 over a connector 50 and with actuators 55 over connector 60. As is known to those skilled in the art, the sensors 45 typically may include a transmission speed sensor that produces a transmission speed signal. The ECM 15 generally is able to calculate the ground speed of the work equipment from the transmission speed signal, the transmission gear ratio and other operating parameters of the work equipment. The ECM 15 produces control signals on connector 60 to control various transmission actuators 55, which may include solenoid controls that cause the transmission to engage one of a plurality of different gears.

The ECM 15 is also connected to a hydraulic cylinder 39 or other device to perform work on a work load through a connector 42 and controls the motion of a work implement associated with the hydraulic cylinder 39 through control signals issued on connector 42. Typically, the ECM 15 generates the control signals as a function of various operator inputs 44 which produce signals on connector 46 that are inputs to the ECM 15. However, the control signals may also be generated in response to other work equipment sensors or algorithms stored in the ECM 15 to permit a degree of autonomous motion.

The ECM 15 is connected with a variety of parasitic load devices 65 over connectors such as 70. In a preferred embodiment, one such parasitic load 65 includes an engine cooling fan 66. Other such devices might include an alternator or generator, a compressor for an air conditioning system, a power steering or power braking pump, among others. As shown in FIG. 1, the ECM 15 produces a cooling fan signal on connector 70 that controls the rotational speed of the engine cooling fan 66 and therefore can increase or decrease the amount of air travelling through the engine's radiator. In this manner, the ECM 15 can control the heat rejection capabilities of the radiator by increasing the speed of the fan 66 when increased cooling is required and decreasing the fan speed, or turning it off, when lesser cooling is required. Increased fan speed, however, comes at the expense of additional engine power being required to drive the engine cooling fan 66.

Referring now to FIG. 2, a general block diagram of a preferred embodiment of software control associated with the present invention is shown. Program control begins in block 200 and moves to block 210.

In block 210, program control determines whether the parasitic loads are using any of the power output of the engine 30. Those skilled in the art will recognize that there are a plurality of ways to determine the total parasitic load demand, any of which can be used in connection with the present invention. In a preferred embodiment, however, the ECM 15 uses a map, equation, calculation or other method to correlate the power requirement of a particular device to either the ECM 15 command for that device or another engine operating condition, for example engine speed. The ECM 15 is then able to determine the amount of power that is required to operate that particular parasitic load device. The ECM 15 preferably adds the power requirements for one or more parasitic load devices to determine a parasitic load power requirement. Program control then passes from block 210 to block 220.

In block 220, the ECM 15 permits the engine 30 to produce different maximum output power levels based on the amount of power required by the parasitic load devices 65. For example, an engine may be capable of producing 350 horsepower when the parasitic load devices require less than a first determined amount of power and may be capable of an increased power output, for example 400 horsepower, when the parasitic load devices require more than a second determined amount of power. By doing so the ECM 15, to some degree, maintains a relatively constant power output to the work implements and transmission. In a preferred embodiment of the present invention, at least two fuel delivery limit curves are stored in the memory associated with the ECM 15. The ECM 15 uses the fuel delivery limit curves to limit the amount of fuel that may be injected into the engine cylinders over the engine's operating speeds and under certain operating conditions. Thus, if the operator inputs cause the ECM 15 to calculate a fuel delivery that exceeds the amount specified in the fuel delivery limit curve, then the fuel delivery limit curve limits the amount of fuel delivered. In this manner, the active fuel delivery limit curve determines the maximum power output of the engine 30. In a preferred embodiment, the ECM 15 uses a first fuel delivery limit curve associated with lower power outputs when the parasitic load devices require less than a first predetermined parasitic load power and uses a second fuel delivery limit curve when the parasitic load demand is greater than or equal to a second predetermined parasitic load power. For parasitic load power levels between the first and second predetermined level the ECM 15 calculates or otherwise determines a fuel delivery limit based on said first and second fuel delivery limit curves. From block 220, program control passes to block 230 and returns to the calling control loop.

Referring now to FIG. 3, a flow chart for a preferred embodiment of the software control associated with the present invention is shown for an embodiment in which the parasitic load includes an engine cooling fan 66. In this embodiment, program control begins in block 300 and passes to block 310. In block 310 the ECM 15 inputs an engine temperature signal produced by an engine temperature sensor 35 and responsively determines an engine temperature. Program control then passes to block 320.

In block 320 the memory associated with the ECM 15 includes a map or equation to permit the ECM 15 to calculate or determine a desired cooling fan 66 speed based on the sensed engine temperature, among other factors. The ECM 15 preferably compares the engine temperature signal to the map stored in memory, determines a corresponding cooling fan command signal corresponding to a desired engine cooling fan 66 speed and produces the signal on connector 70. The engine speed cooling fan 66 is designed to run within a specified tolerance of a desired speed corresponding to the cooling fan speed signal and operates under open loop control to thereby control the temperature of the engine. In general, as the temperature of the engine increases the need for cooling increases and the ECM 15 will produce engine speed cooling fan signals causing the engine cooling fan 66 speed to increase. Running the engine cooling fan 66 at faster speeds requires a greater amount of engine power than running the fan at lower speeds. Thus, when the engine is running a hotter temperatures, the ECM 15 will issue command signals that cause the fan speed to increase, thereby increasing the parasitic power load requirement from the engine 30 and decreasing the amount of power available for the work implement system 39 and the transmission 32. Program control passes from block 320 to block 330.

In block 330, the ECM 15 determines the amount of power required by the engine cooling fan 66 and increases the maximum permitted power output of the engine 30 to compensate for any increase in parasitic load. In one embodiment, the memory associated with the ECM 15 includes a map or other method for recording or calculating a relationship between the engine cooling fan speed command and the amount of engine power required by the fan for that commanded speed. The ECM 15 then permits the rated power output of the engine to increase by an amount dependent on the parasitic power load, in an attempt to keep the maximum amount of power available for the work implement system 39 and the transmission 32 relatively constant. In this embodiment of the software control the memory associated with the ECM 15 preferably includes a table or map that includes at least two different engine power ratings. A first engine rating is used when the cooling fan is not rotating and therefore is requiring little, if any, engine power, and a second higher rating that is used when the fan is turning at or near maximum speed and therefore is requiring a maximum or near maximum amount of fan power. The engine power ratings are typically stored as fuel delivery limit curves as described in more detail below, with reference to FIG. 4. The ECM 15 then compares the commanded engine cooling fan speed to the cooling fan speeds associated with the first engine rating and the second engine rating. If the commanded engine cooling fan speed is zero, then the ECM 15 will use the first engine rating. If the commanded cooling fan speed is the maximum command, then the ECM 15 will use the second engine rating. Otherwise if the commanded cooling fan speed is between zero and the maximum speed, then the ECM 15 will calculate or otherwise determine an engine rating between the first and second engine ratings, as a function of the first and second engine ratings, preferably by interpolation. The ECM 15 will then use the calculated engine rating to control the maximum power output of the engine, thereby permitting the engine to produce an increased amount of overall power to compensate for parasitic power loss resulting from operating the engine cooling fan. Program control then passes from block 330 to block 340 and program control returns to the calling control loop.

FIG. 4 generally shows a map 400 of two engine power ratings that may be used in connection with an embodiment of the present invention. As described above, these engine power ratings may be stored as fuel delivery limit curves. As shown in the drawing, the map preferably includes a first engine power rating 420 associated with a first engine cooling fan speed and a second engine power rating 410 associated with a second cooling fan speed. FIG. 4 shows a generic representation of the engine power ratings that may be used in connection with the present invention. However, the present invention is not limited to the specific ratings shown in the drawing. To the contrary, it is contemplated that the specific ratings used will depend on the specific engine and work equipment configuration, including the engine cooling fan and other parasitic loads that may be connected with the engine.

What is claimed is:

1. A system for controlling fuel delivery to a compression ignition engine, said engine controllably providing power output to at least one of a transmission and a work implement system, said engine powering at least one other device, said apparatus comprising:

an electronic control module connected with said other device and at least one of said transmission and work implement system;

a fuel injection device connected with said electronic control module;

said electronic control module using a first fuel delivery limit, which keeps a predetermined amount of power available for the at least one of the transmission and the work implement system, in response to said device having a first power requirement; and said electronic control module using a second fuel delivery limit which keeps said predetermined amount of power available for the at least one of the transmission and the work implement system, in response to said device having a second power requirement.

2. The system of claim 1, wherein said device includes an engine cooling fan.

3. The system of claim 1, including a third fuel delivery limit calculated as a function of said first and second fuel delivery limits, said electronic control module using said third fuel delivery limit in response to said device having a third power requirement.

4. The system of claim 3, wherein said second fuel delivery limit permits increased fuel delivery over said first fuel delivery limits.

5. The system of claim 4, wherein said device includes an engine cooling fan.

6. An apparatus, comprising:

a compression ignition engine producing output power;

a parasitic load connected with the compression ignition engine, said parasitic load using at least a part of said output power of said engine;

means for varying the power output of said compression ignition engine to keep a predetermined amount of power available for at least one of a propulsion device and a work implement, depending at least in part on the power output used by said parasitic load.

7. The apparatus according to claim 6 wherein said parasitic load includes an engine cooling fan.

8. The apparatus according to claim 7, wherein said parasitic load includes an air conditioning compressor.

9. The apparatus according to claim 7, wherein said parasitic load includes at least one of an alternator and a generator.

10. A method for varying the power output of an electronically controlled compression ignition engine, said engine including an electronic control module having a memory device with fuel delivery maps stored therein, a fuel system connected with said electronic control module, and a parasitic load device connected with said electronic control module, said method comprising:

determining the amount of engine power demanded by said parasitic load device;

setting fuel delivery as a function of said parasitic load device demanding a first power level combined with a predetermined power availability determination for at least one of a propulsion device and a work implement; and setting delivery as a function of said parasitic load device demanding a second power level combined with said predetermined power availability determination.

11. The method of claim 10, wherein said step of determining the engine power demanded by said parasitic load device includes determining a value of a parasitic load device command issued by said electronic controller.

12. The method of claim 10, wherein said parasitic load device includes an engine cooling fan.

13. The method according to claim 11, wherein a first fuel delivery limit is associated with a first parasitic load power demand and a second fuel delivery limit map is associated with a second parasitic load power demand; and including limiting fuel delivery as a function of said first and second fuel delivery limit maps for parasitic load power demands other than said first and second parasitic load power demands.

14. The method according to claim 13, wherein said parasitic load device includes an engine cooling fan.

15. The method of claim 10, wherein setting fuel delivery includes interpolating a fuel delivery setting as a function of said first and second parasitic load power demands.

16. A method of controlling a compression ignition engine, said engine being capable of providing power to at least one of a transmission and a work implement system, and said engine being capable of providing power to a parasitic load device, said method comprising:

determining whether said engine is providing power to said parasitic load device;

increasing the power output of said engine if said engine is providing power to said parasitic load device.

17. The method according to claim 17, wherein said parasitic load device includes an engine cooling fan.

18. The method according to claim 17, wherein increasing the power output of said engine includes:

determining the amount of power demanded by said parasitic load; and increasing the power output of said engine as a function of said amount of power demanded by said parasitic load.

19. The method according to claim 17, wherein increasing the power output of said engine includes:

determining the amount of power provided to said parasitic load; and increasing the power output of said engine as a function of said amount of power provided to said parasitic load.

20. The method of claim 18, wherein increasing the power output of said engine includes:

determining the amount of power demanded by said engine cooling fan; and increasing the power output of said engine as a function of said amount of power demanded by said engine cooling fan.

21. The method according to claim 18, wherein increasing the power output of said engine includes:

determining the amount of power provided to said engine cooling fan; and increasing the power output of said engine as a function of said amount of power provided to said engine cooling fan.

* * * * *